United States Patent Office 3,117,154
Patented Jan. 7, 1964

3,117,154
OXIDATION PROCESS FOR THE PRODUCTION OF AROMATIC NITRILES
Frank J. Kreysa, Bethesda, Md., assignor to W. R. Grace & Co., New York, N.Y., a corporation of Connecticut
No Drawing. Filed June 20, 1962, Ser. No. 203,707
6 Claims. (Cl. 260—465)

This invention relates to the production of aromatic nitriles. In one specific aspect, it relates to the preparation of cyanostyrene and terephthalonitrile.

Cyanostyrene has been known for some time but has has never been widely used. The chief reason for this is the lack of a low-cost industrial synthetic process for its preparation.

Recently, interest has awakened in the compound due to its structural relationship to both styrene and acrylonitrile. It is speculated that cyanostyrene polymers may have the good properties of polystryrene without its drawbacks. Further, if cyanostyrene were readily available, a vast new set of polymers could be based on it as a monomer.

It would be highly desirable, then, to develop a method for synthesizing cyanostyrene which would be suitable for large-scale production.

It is an object of this invention to provide such a process.

I have found that divinyl benzene can be treated in an "ammoxidation" reaction to yield cyanostyrene, terephthalonitrile and other valuable products.

Briefly, the process consists of contacting divinyl benzene with ammonia and oxygen in the presence of a catalyst at an elevated temperature. The reaction is illustrated by the following equation:

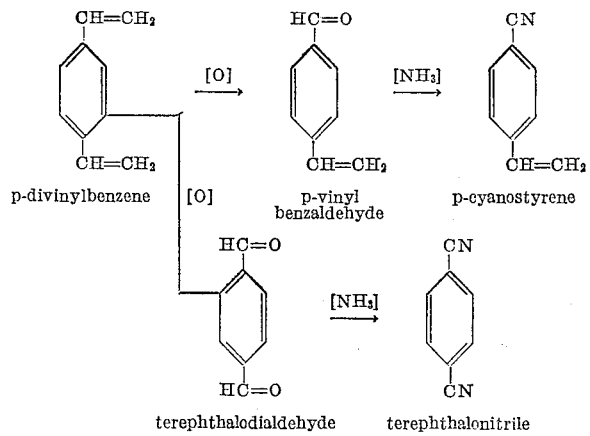

Divinyl benzene is a commercially available raw material. Generally, it is available as a mixture of the ortho, meta and para isomers. I have used the commercially available product as my starting material and recovered the corresponding cyanostyrene isomers and terephthalonitrile as products. However, the pure isomers are equally suitable as starting materials in this process.

Any source of oxygen can be used in the process of my invention. Air is a very good source both for convenience and for economic reasons. However, I have substituted molecular oxygen for air with good results. The ratio of divinyl benzene to oxygen either as air or as molecular oxygen should be in the range of about 1:1 to 1:5 and preferably about 1:1 to 1:3. The ratio of divinyl benzene to ammonia should be from 1:1 to 1:10 and preferably 1:6 to 1:8.

It has been shown that the presence of water vapor increases the yield of the cyanostyrene in the reaction. The ratio of divinyl benzene to water can be about 1:1 to 1:10, but preferably 1:4 to 1:6. The reaction will proceed in the absence of water vapor, however, but with lower yields of cyanostyrene.

I have used a high dilution technique in my process, (i.e., 100–200 moles of nitrogen to mole of divinyl benzene) when using a fixed bed catalyst system in order to control the reaction. The reaction will also give satisfactory results in a fluidized bed system.

The catalyst used in this process is a modified bismuth salt of phosphomolybdic acid supported on a silica carrier. Any suitable carrier could be used however. The carrier is generally present in amounts of less than 90% by weight of the final catalyst composition.

The conventional bismuth phosphomolybdate catalyst is modified by the addition of a small amount of sodium bicarbonate to prevent cracking of the hydrocarbons. This is important since the raw material contains two vinyl groups.

The reaction proceeds satisfactorily at temperatures of about 450 to 550° C. The preferred temperature of operation is about 475–525° C.

The reaction proceeds quite adequately at atmospheric pressure. A slight pressure, (i.e., 1–3 atmospheres) or partial vacuum could be used but is unnecessary.

The apparent contact time can be defined as the length of time in seconds in which a unit volume of gas, measured under the conditions of the reaction, is in contact with the apparent unit volume of catalyst. It can be be calculated according to the following formula:

$$t = \frac{\text{Volume of catalyst}}{\text{Volume of reactants (per hour) at average reactor temperature}} \times 3{,}600 \text{ sec}/\text{hr}.$$

The apparent contact time used in the process can range from about 0.1 to 20 seconds, preferably 0.5 to 5 seconds. I have used relatively short contact time when using the high dilution technique. However, longer contact times can be employed where the high dilution technique is not employed.

The equipment required for the reaction is the standard type used for carrying out vapor-phase oxidation reactions and is well known to those skilled in the art.

The reaction can be carried out satisfactorily in a reactor of Vycor, quartz or other high temperature resistant material. The reactor is filled with an appropriate catalyst and heated to the desired temperature. The divinyl benzene and water are introduced by a metering pump, the gaseous reactants and diluents are introduced from pressurized containers and the amount introduced measured by flow meters.

The reactants are introduced into the reactor either at reaction temperature by first passing them through a preheater zone or by introducing them directly into the reactor and then bringing them to reaction temperature.

The reaction products can be recovered by any desirable method. I have used several different techniques. One method involves the use of solvent scrubbers in which I used methylene chloride or ether as the solvent. This method is especially useful when the high dilution technique previously described is used. Another convenient method is simply passing the effluent gases through a series of traps cooled with solid carbon dioxide and thus isolating the products by condensation.

The pyrolyzates were analyzed using standard techniques including mass spectrometry, infra-red, vacuum distillation and titrations where applicable.

The invention will be further explained by the following specific but non-limiting examples.

Example I

The preparation of the catalyst is described in this example.

A solution containing 9.3 ml. of 85% phosphoric acid, 272 g. of molybdic acid (85% $MoO_3$), 40 ml. of nitric acid and 582 g. of $Bi(NO_3)_3.5H_2O$ in 400 ml. of water was added to 750 g. of an aqueous colloidal silica sol containing 30% silica.

After thorough agitation, the mixture was evaporated to dryness on a water bath which took about 16 hours. The dry mixture was calcined in a muffle furnace in static air atmosphere for another 16 hours at 538° C. Initial heat was supplied slowly to control the evolution of nitrogen oxides.

The material was then impregnated with an aqueous solution of sodium bicarbonate to give 1–2% $Na_2O$ content and again calcined. It was then ground and screened to 6–10 mesh particle size.

Example II

A 110 g. charge of the catalyst prepared according to Example I was placed in a Vycort tube 75 cm. long and having an outside diameter of 25 millimeters with an axially situated thermocouple well which was 7 mm. in diameter. The reactor was supported in a vertical position with the gas and liquid streams entering at the top. Heat was supplied by means of two separate Nichrome wire windings so that uniform temperature could be obtained throughout the reactor. The upper section which served as a preheater was packed with glass helices having a ¼″ internal diameter. The gases leaving the preheater were rapidly brought to the reaction temperature upon passing through a constricted section of the tube maintained at reaction temperature. The reaction zone had a volume of approximately 130 ml. The catalyst was diluted with decreasing amounts of Vycor chips of the same mesh through the first ¾ of the reactor. The last quarter of the reactor contained 100% catalyst.

The reactants were introduced so that the feed had the following mole ratio composition:

| | |
|---|---|
| Divinyl benzene | 1.0 |
| Oxygen | 4.8 |
| Ammonia | 5.7 |
| Nitrogen | 184 |
| Water | 5.6 |

The reactants were first introduced into a preheater zone maintained at 150 to 200° C., then into the reactor. The reaction was allowed to run for one hour and the temperature maintained between 490–515° C. The apparent contact time was 0.5 seconds.

The effluent gases were collected in an ether scrubber and then the ether evaporated. The residue was analyzed by infra-red and mass spectrometry. The yield of cyanostyrene was 31.7%, and the yield of terephthalonitrile was 30%. Percent conversion of cyanostyrene per pass on a carbon basis was 29.0%, calculated according to the following formula:

$$\frac{\text{Weight of carbon in the product}}{\text{Total weight of carbon in the divinyl benzene feed}} \times 100$$

The yield of the cyanostyrene product or selectivity was 31.7% (carbon basis). The yield or percent selectivity is defined as the quantity of limiting reactant which goes to form the desired product, expressed as a percent of the quantity of the limiting reactant consumed and is calculated as follows:

$$\frac{\text{Weight of carbon in the product}}{\text{Total weight of carbon in the converted divinyl benzene}} \times 100$$

Example III

Another run was made at a lower ratio of oxygen.

110 grams of the catalyst, diluted with Vycor chips as described in Example II were placed in the reactor.

The reactants were then introduced into the reactor over a period of one hour. Reactor temperature was held between 480–505° C. during the reaction.

The following mole ratios of reactants were introduced:

| | |
|---|---|
| Divinyl benzene | 1.0 |
| Oxygen | 1.3 |
| Ammonia | 5.7 |
| Nitrogen | 184 |
| Water | 5.1 |

The apparent contact time was 0.5 seconds. The exit gases were collected in solvent scrubbers using ether as the solvent. The ether residue was analyzed by mass spectrometry and infra-red technique as in Example II. Conversion per pass in this run was 13.2% cyanostyrene and 40% terephthalonitrile.

What is claimed is:

1. A process for preparing p-cyanostyrene and terephthalonitrile which comprises contacting in the vapor phase about 1 to 5 moles of oxygen and about 1 to 10 moles of ammonia with each mole of p-divinyl benzene in the presence of a bismuth phosphomolybdate catalyst containing 1 to 2% sodium bicarbonate at a temperature of about 450 to 550° C. and recovering the cyanostyrene and terephthalonitrile products.

2. A process for preparing p-cyanostyrene and terephthalonitrile which comprises contacting in the vapor phase p-divinyl benzene with oxygen in about a 1 to 3 mole ratio, and ammonia in about a 1 to 7 mole ratio in the presence of a gaseous diluent and at a temperature of 475 to 525° C. in the presence of a bismuth phosphomolybdate catalyst containing 1 to 2 percent $Na_2O$ and recovering the cyanostyrene and terephthalonitrile products.

3. A process according to claim 2 wherein the diluent is present in the ratio of 100 to 200 moles of diluent per mole of p-divinyl benzene.

4. A process for preparing p-cyanostyrene and terephthalonitrile which comprises contacting in the vapor phase and at a temperature of 475 to 525° C. p-divinyl benzene with oxygen in about a 1 to 3 mole ratio and ammonia in about a 1 to 7 mole ratio in the presence of water vapor and a catalytic amount of bismuth phosphomolybdate catalyst containing 1 to 2% $Na_2O$ and recovering the cyanostyrene and terephthalonitrile products.

5. A process according to claim 4 wherein the water is present in an amount equal to 1 to 10 moles per mole of p-divinyl benzene.

6. A process according to claim 4 wherein the reaction was run at about atmospheric pressure and at an apparent contact time of 0.1 to 20 seconds.

References Cited in the file of this patent

UNITED STATES PATENTS 2,941,007   Callahan et al. _____ June 14, 1960

OTHER REFERENCES

Mahan et al.: Abstract of application Serial No. 120,606, published June 5, 1951, O. G. vol. 647.